May 27, 1969

JAMES E. WEBB
ADMINISTRATOR OF THE NATIONAL AERONAUTICS
AND SPACE ADMINISTRATION
PIPING ARRANGEMENT THROUGH A DOUBLE WALL CHAMBER 3,446,387

Filed May 17, 1967

*INVENTOR.*
STEPHEN P. YAGER

BY

*ATTORNEYS*

United States Patent Office 3,446,387
Patented May 27, 1969

3,446,387
PIPING ARRANGEMENT THROUGH A
DOUBLE WALL CHAMBER
James E. Webb, Administrator of the National Aeronautics and Space Administration, with respect to an invention by Stephen P. Yager, Whittier, Calif.
Filed May 17, 1967, Ser. No. 640,784
Int. Cl. B65d 25/00
U.S. Cl. 220—14          5 Claims

ABSTRACT OF THE DISCLOSURE

A low loss double wall piping arrangement in which a straight through conduit which is capable of linear expansion and contraction is used for piping cryogenic media or the like into an inner high vacuum chamber through an outer chamber maintained at guard vacuum. An insulator with low thermal gradient inflexibly supports the end of the conduit extending into the inner chamber, while a bellows flexibly seals the other end of the conduit through a concentric tube to the outer wall of the outer chamber. The conduit and the concentric tube define an annular space about the conduit so that the environment about the conduit is that of the guard vacuum of the outer chamber.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

Field of the invention

This invention relates to a liquified gas piping arrangement and, more particularly, to improvements therein.

Description of the prior art

Various devices are presently known for piping cryogenic liquids to a storage chamber in which they are to be maintained at a very low temperature. Similarly, in cryogenic applications, various piping arrangements are employed to inject cryogenic media, either liquid or gas into a high vacuum chamber for cooling purposes. Generally, the high vacuum chamber is an inner chamber, surrounded by an outer chamber acting as a guard vacuum. The function of the outer chamber is to serve as a thermal barrier. The cryogenic media must be piped into the inner chamber through the outer chamber. In the prior art, in order to allow for expansion and contraction between the chambers, a curved conduit is generally employed.

Though such an arrangement solves the problem of relative expansion and contraction between chambers, the increased length of the conduit results in a bulky and cumbersome arrangement and lowers the overall system's efficiency. As a result, such an arrangement cannot be employed satisfactorily where the system's efficiency is of primary importance.

OBJECTS AND SUMMARY OF THE INVENTION

It is therefore a primary object of the invention to provide a new arrangement for piping cryogenic media into an inner chamber through an outer chamber.

Another object is the provision of a low loss double wall feed through arrangement.

A further object is to provide an efficient arrangement for piping cryogenic media through a double wall chamber without resort to a curved conduit.

These objects of the invention are achieved by providing a straight conduit which extends from an exterior source to an inner chamber through an outer chamber surrounding it. A substantial portion of the conduit extending through the outer chamber is surrounded by an insulator of a low thermal gradient, thermally insulating the conduit from the environment in the outer chamber. The upper end of the insulator is integral with the conduit, while the lower end is integral with a flange, thus sealing and supporting the conduit extending into the inner chamber.

A hollow elongated tube, is mounted concentric with the conduit and surrounding it, with the upper ends of both tubes, exterior to the outer chamber, being integral with each other, so as to form an annular space about the conduit, which is in communication with the outer chamber. A flexible member such as a bellows has one end fastened to the outer chamber wall while the other end is fastened to the open end of the hollow elongated tube surrounding the conduit. Consequently, the conduit assembly is flexibly sealed with respect to the outer chamber thereby providing the necessary flexibility for expansion or contracting of the chambers with respect to one another. The outer chamber is maintained at a guard vacuum so that, except for the portion of the conduit covered by the insulating material, a major portion of the exterior surface of the conduit is maintained at the guard vacuum environment of the outer chamber thereby minimizing conduction losses therefrom.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
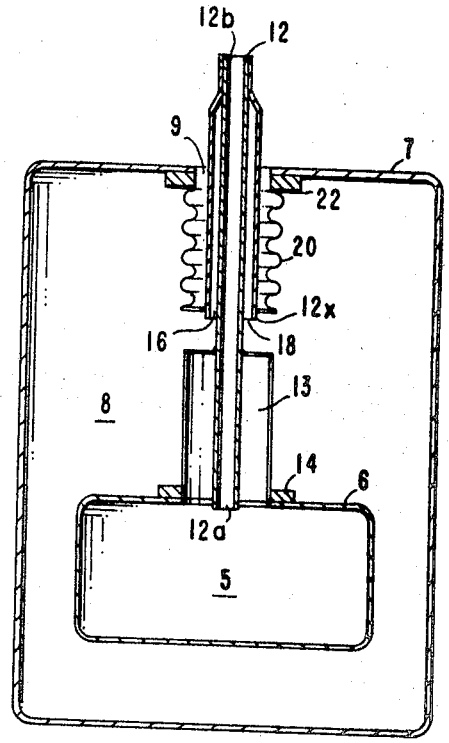
FIGURE 1 is an enlarged cross-sectional view of the piping arrangement of the present invention.
Figure 2:
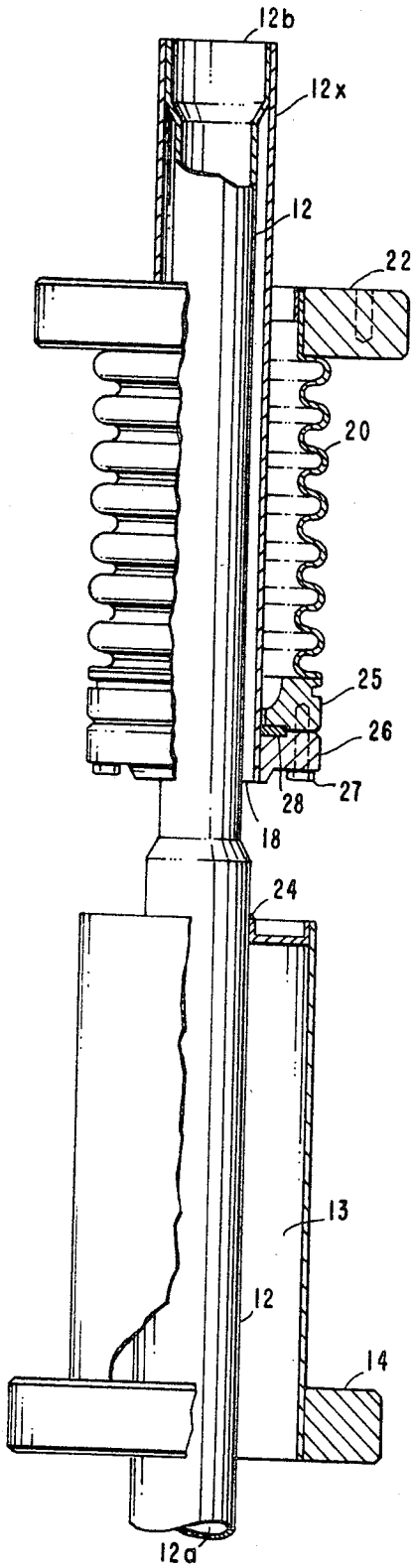
FIGURE 2 is a combination side and cross-sectional view of the piping arrangement of the present invention, actually reduced to practice.

Referring to FIGURES 1 and 2, there is shown a straight central conduit 12, extending from an external source to an inner chamber 5 formed by a wall 6. The conduit 12 may be thought of as having an end 12a which extends into the inner chamber 5 and an opposite end 12b which is assumed to be connected to the source of cryogenic media. A wall 7 surrounds wall 6 and the space therebetween defining an outer chamber 8, through which conduit 12 extends from the outside to the inner chamber 5. A substantial portion of conduit 12, extending through outer chamber 8 is thermally insulated by 13. Near end 12a, a flange 14 is attached to the thermal insulator 13. Flange 14 is assumed to be attached or secured to wall 6 thereby enclosing the inner chamber 5.

In addition to central conduit 12, the piping arrangement of the present invention includes a second hollow elongated tube 12x which is mounted concentric with and surrounds the central conduit 12. Outer tube 12x surrounds the central conduit 12 within the outer chamber 8, as well as a portion thereof extending out of the chamber 8. Thereat, the conduit 12x is attached, such as by welding, to the central conduit 12 to define an annular spacing 16 about the central conduit. The annular spacing 16 is in communication with the space in the outer chamber 8 through opening 18.

In practice, the inner chamber 5 is maintained at a very high vacuum, with the cryogenic media piped therein. To minimize thermal losses, the outer chamber 8 is maintained at a guard vacuum to create a thermal barrier about chamber 5 and thereby reduce the thermal losses of the system. The means for producing the vacuums in the two chambers are deleted from FIGURE 1, since such means are well known in the art and are not deemed as part of the invention disclosed herein.

In addition to the foregoing described parts of the piping amendment of the present invention, the arrangement includes a flexible member, such as a bellows 20, having one end thereof secured to the outside of conduit 12x near end 18, while the other end thereof is secured to a flange 22 which is in turn used to attach the bellows to wall 7, which defines the outer chamber 8.

The bellows provides the necessary flexibility for the relative expansion and contraction of the two chambers with respect to one another.

While the outer conduit 12x is used together with bellows 20 and flange 22 to secure the central conduit 12 with respect to the other chamber 7, the annular space 16 formed by conduit 12x together with the central conduit 12 provides a guard vacuum environment over all of the exterior of conduit 12, not covered by the thermal insulator 13. As a result, thermal losses due to conduction from the central conduit 12 as the cryogenic media passes into inner chamber 5 are held to a minimum. It should be appreciated by those familiar with the art that with the arrangement as hereinbefore described, the conduit 12 is a straight conduit extending from the outside through chamber 8 to chamber 5. Its length need only be enough to extend through the outer chamber 8. Thus, by minimizing its length, the system's efficiency is increased.

FIGURE 2 represents a combination side and cross sectional view of a piping arrangement actually reduced to practice. In FIGURE 2, elements like those shown in FIGURE 1 are designated by like numerals. In FIGURE 2, numeral 24 represents a point at which the thermal insulator 13 is welded to the exterior surface of the central conduit 12 to provide the inner chamber vacuum seal-off. As seen from FIGURE 2, the end of the bellows 20 to be coupled to the outer tube 12x near end 18 is preferably welded to a flange 25 which is in turn fastened to a flange 26, welded about the periphery of outer tube 12x near opening 18. Any conventional fastening means such as a screw 27 may be used to fasten flanges 25 and 26 to one another, with a copper alloy seal 28 inserted therebetween. The function of seal 28 is to seal the inside environment of bellows 20 from the outside environment thereof which is at the guard vacuum of outer chamber 8.

There has accordingly been shown and described herein a novel piping arrangement, by means of which cryogenic media or any other media to be maintained at very low temperatures may be pumped or injected into an inner chamber through an outer chamber. The arrangement incorporates a straight conduit of minimum length, in order to increase efficiency. The arrangement provides flexible means about the conduit so that the straight conduit may be securely fastened to both the outer and inner chambers and yet provide sufficient flexibility for the relative expansion and contraction of the two chambers with respect to one another. Such flexibility is provided by the bellows 20 and the particular arrangement in which the conduit 12 is supported within the outer chamber.

Also, the use of a thermal insulator to isolate the conduit, extending through the inner chamber, as well as the use of an annular space about the conduit to maintain it at the guard vacuum environment of the outer chamber, greatly account for the minimizing of thermal conduction losses of the piping arrangement. It is appreciated that those familar with the art may make modifications in the arrangements as shown with departing from the true spirit of the invention.

I claim:
1. An arrangement for piping cryogenic media into a first chamber defined by an inner shell and surrounded by a second chamber defined by an outer shell from a source of gas through aligned openings defined in said first and second shells comprising:
   an elongated straight central conduit having first and second ends, the first end thereof being in communication with said first chamber through the opening in said inner shell and the second end extending to the exterior of said second chamber;
   a tubular insulating means surrounding said conduit near the first end thereof;
   a first flange integrally fused to the insulating means adjacent said first end of said conduit for coupling said insulating means to said inner shell about the opening thereof with the first end of said conduit in communication with said first chamber;
   an elongated tube concentric with said conduit and surrounding a portion thereof in said second chamber, said tube being spaced from said straight conduit except at one end exterior to said second chamber so as to define an annular space, around the conduit in said second chamber, which sapce is in communication with the second chamber; and
   flexible means integrally coupled to said tube and to said outer shell for flexibly sealing said tube and the conduit concentric therewith in said second chamber, whereby a portion of said conduit extending through said second chamber is surrounded by said thermal insulating means and substantially the rest of the exterior surface of said conduit in said second chamber is surrounded by the annular space which is in communication with said second chamber.

2. The arrangement as recited in claim 1 wherein said flexible means comprises a bellows having one end thereof integrally connected to said tube near the inner end thereof at which the annular space defined thereby is in communication with said second chamber and an opposite end of said bellows is coupled to said outer shell about the opening thereof to enclose said second chamber from the environment exterior thereto.

3. The arrangement as recited in claim 2 wherein the interior of said bellows is in communication with the environment exterior the second chamber and the exterior of said bellows is in communication with the environment in said second chamber.

4. A vacuum jacketed chamber adapted to contain a cryogenic media or the like at a low temperature substantially below ambient temperature the combination comprising:
   a first wall defining a first inner chamber;
   a second wall surrounding and spaced from said first wall and defining with said first wall a second chamber adapted to be evacuated to provide a barrier to the admittance of ambient heat therethrough to said first chamber;
   a first elongated hollow tube having first and second ends, with said first end extending to said first chamber through said second chamber;
   a tubular thermal insulator surrounding and concentric with said first tube near the first end thereof;
   a first flange fused to the end of said thermal insulator near the first end of said first tube;
   means connecting said first flange to said first wall with the first end of said first tube therein whereby cryogenic media may be introduced into and removed from said first chamber through said first end;
   a second hollow elongated tube concentric with said first tube and surrounding a portion of said first tube which extends through said second wall into said second chamber;
   a first end of said second tube exterior to said second chamber being fused to said first tube, whereby the tubes define an elongated annular space about said first tube which communicates with said second chamber near the second end of said second tube; and flexible means with first and second ends the first end being coupled to the second end of said second tube and its second end to said second wall, whereby said second wall is flexibly connected to said second tube.

5. The combination defined in claim 4 wherein said flexible means comprises a bellows whereby the interior of said bellows is at the environment exterior said second chamber and the exterior of said bellows is at the vacuum of said second chamber.

References Cited

UNITED STATES PATENTS

| 1,392,204 | 9/1921 | Nichols | 220—14 |
| 3,059,804 | 10/1962 | Wissmiller | 220—14 |

FOREIGN PATENTS

| 180,082 | 5/1922 | Great Britain. |
| 579,840 | 8/1946 | Great Britain. |

GEORGE E. LOWRANCE, *Primary Examiner.*

JAMES R. GARRETT, *Assistant Examiner.*